United States Patent [19]
Saunders et al.

[11] Patent Number: 5,509,415
[45] Date of Patent: Apr. 23, 1996

[54] METHOD FOR REDUCING VECTOR DENSITY BASED ON IMAGE SIZE

[75] Inventors: Rowland F. Saunders, Hartland; Michael J. Washburn, New Berlin, both of Wis.

[73] Assignee: General Electric Company, Milwaukee, Wis.

[21] Appl. No.: 343,317

[22] Filed: Nov. 22, 1994

[51] Int. Cl.⁶ .................................................. A61B 8/00
[52] U.S. Cl. .................................................. 128/660.07
[58] Field of Search .......................... 128/660.06, 660.07, 128/660.08, 661.01, 661.07, 661.08, 661.09; 73/625, 626, 597, 861.25

[56] References Cited

U.S. PATENT DOCUMENTS 5,379,642  1/1995  Reckwerdt et al. ............... 128/661.01

*Primary Examiner*—George Manuel
*Attorney, Agent, or Firm*—B. Joan Haushalter; John H. Pilarski

[57] ABSTRACT

In a method for maximizing frame rate of an ultrasound imaging apparatus, ultrasound B and color mode vector density are reduced. Initially, an actual displayed image size is determined. A minimum vector density requirement is then determined for B which will provide a useful image based on the actual displayed image size. The number of vectors in the image is then adjusted to meet the minimum vector density requirement.

8 Claims, 1 Drawing Sheet

METHOD FOR REDUCING VECTOR DENSITY BASED ON IMAGE SIZE

TECHNICAL FIELD

The present invention relates to ultrasound imaging and, more particularly, to a method for reducing ultrasound B and color vector density based on image size.

BACKGROUND ART

On some ultrasound machines, different imaging formats such as B and timeline mode or dual B mode cause the size of the B or B/color image to be reduced in size. This reduction in size is relative to the normal size of the B or B/color image when only B or B/color is being used. Obtaining the same resolution on the smaller B or B/color image may require less vectors than the full image. Current machines use the same number of vectors regardless of the image size. Unfortunately, firing more vectors than are needed to obtain the target image resolution reduces the overall frame rate with no net gain or advantage. Especially in timeline modes, the frame rate can affect the diagnostic quality of the image.

It would be desirable then to have a firing recipe wherein ultrasound B and color mode vector density reduction based on image size can be achieved.

SUMMARY OF THE INVENTION

This need is met by the method of the present invention wherein ultrasound B and color mode vector density reduction based on image size is achieved. The present invention provides for a firing sequence wherein as the vertical size of the image is reduced, the number of vectors being fired for the B and color images is also reduced. If the image is small, fewer fired vectors are needed to fill the display screen, without affecting the image display resolution.

In accordance with one aspect of the present invention, a firing sequence method is used to reduce ultrasound B and color mode vector density, based on image size. The method maximizes frame rate of an ultrasound imaging apparatus. An actual displayed image is determined, based on user selection, and a minimum vector density requirement is then determined for B which will provide a useful image based on the actual displayed image size. The number of vectors in the image is adjusted to meet the minimum vector density requirement, which minimum vector density requirement is a compromise between the maximum information content and the maximum frame rate.

Accordingly, it is an object of the present invention to affect ultrasound B and color mode vector density size, based on image size, for ultrasound imaging equipment. It is a further object of the present invention to determine a firing sequence which maximizes frame rate for ultrasound B and color mode vector density for ultrasound imaging equipment. It is yet another object of the present invention to affect the vector density size and number of vectors fired, without affecting the displayed image resolution.

Other objects and advantages of the invention will be apparent from the following description, the accompanying drawings and the appended claims.

DETAILED DESCRIPTION OF THE PREFERRED EMBODIMENTS

Figure 1:
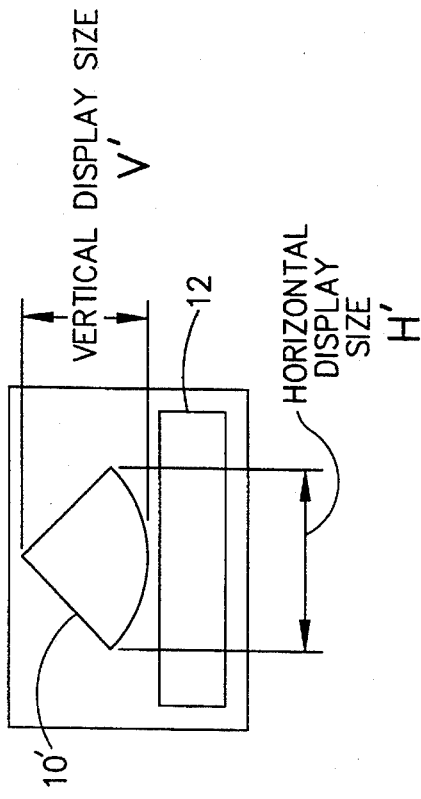
FIGS. 1 and 2 are representative of B only and B/timeline display formats, with differing display sizes.

The present invention determines a firing sequence wherein ultrasound B and color mode vector density reduction, based on image size, is achieved. As the display size V (vertical) or H (horizontal) of an image 10 in FIG. 1 is reduced to a display size V' or H', respectively, of image 10' in FIG. 2, the number of vectors being fired for the B and color images is also reduced. Instead of firing every vector in the normal vector set, every 2nd, every 3rd, every 4th up to every Nth vector can be fired, where N is dependent upon the smallest image possible, the transducer being used, the imaging mode (B or color) and acoustic sampling requirements. The amount of vector density reduction is specified for ranges of image sizes, the transducer being used and the imaging mode.

Figure 2:
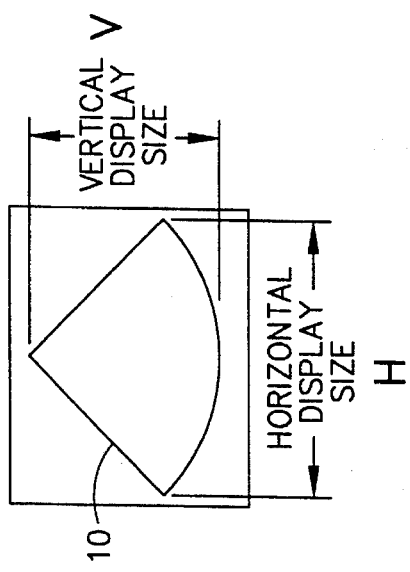

The firing sequence method of the present invention is used to reduce ultrasound B and color mode vector density, based on image size. The method maximizes frame rate of an ultrasound imaging apparatus. An actual displayed image is determined, based on user selection, and a minimum vector density requirement is then determined for B which will provide a useful image based on the actual displayed image size, which may be the vertical or horizontal image size, as illustrated in FIGS. 1 and 2. The number of vectors in the image is adjusted to meet the minimum vector density requirement, which minimum vector density requirement is a compromise between the maximum information content and the maximum frame rate.

As long as the ratio of the image size to the number of vectors is kept constant, the information content of the image will essentially remain the same. A ratio equal to the average beam profile width represents an image which is not undersampled or oversampled. A ratio greater than the average beam profile width represents an image which is undersampled, i.e., needs more vectors. Conversely, a ratio less than the average beam profile width represents an image which is oversampled. That is, the same image could be obtained with fewer vectors.

Using a minimum vector density which achieves the target image resolution instead of not basing the vector density on the image size, provides the same target image resolution at a higher frame rate. This is because more vectors, beyond achieving the ideal ratio, do not add to the image ratio and also because the frame rate is decreased as more vectors are fired.

For example, assume that the average beam profile width is two pixels. If the user selects B mode only, as illustrated in FIG. 1, on a particular transducer, the B mode image size is 200 pixels. This would require 200/2, or 100 B mode vectors to achieve the target image resolution. If the user selects B mode with a timeline mode 12, as illustrated in FIG. 2, on the same transducer, the B mode image size is 120 pixels. This would require 120/2, or 60 B mode vectors to achieve the same target image resolution that was obtained in B mode only. Hence, if all 100 vectors continue to be fired, the frame rate is reduced with no corresponding gain in image resolution.

Figure 3:
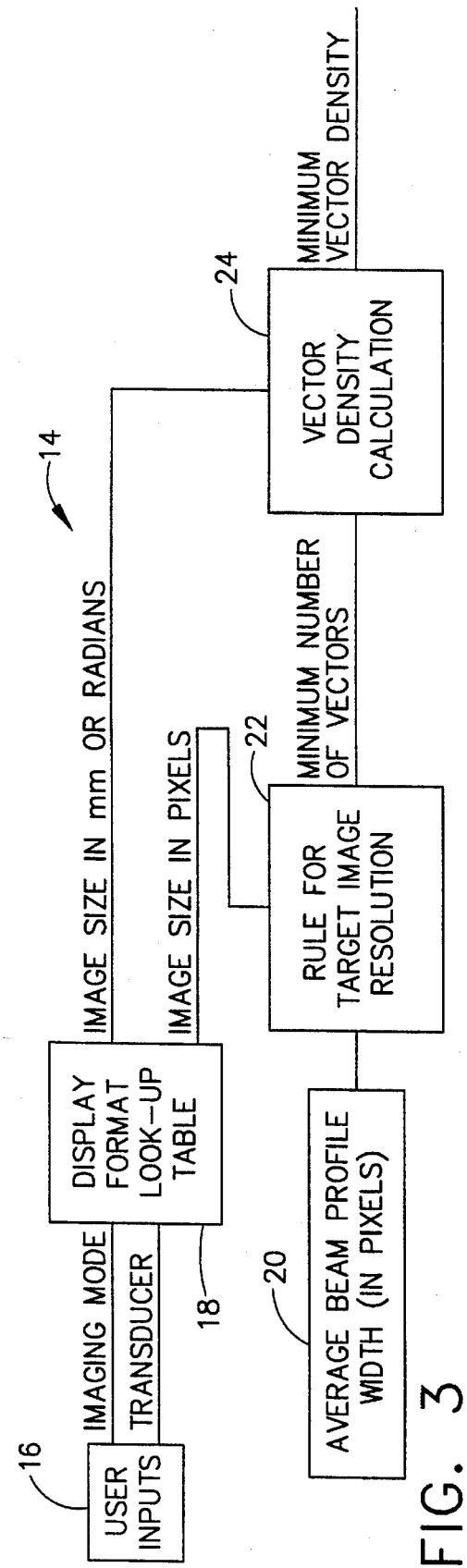
FIG. 3 is a schematic block diagram illustrating the method for reducing vector density based on image size, in accordance with the present invention.

FIG. 3 is a schematic block diagram 14 illustrating the method for reducing vector density based on image size, in accordance with the present invention. Initially, a number of user inputs are selected, such as imaging mode and transducer. The user inputs are used as indicies to a display format lookup table, as indicated by block 18, to provide image size measured in mm or radians, and image size in pixels. The image size in pixels and an average beam profile width measured in pixels, are provided to block 22, where a rule for target image resolution is applied to provide a minimum number of vectors. The minimum number of vectors to achieve the target image resolution is the image size divided by the average beam profile width, where each variable has pixels as the units. The average beam profile width 20 is based on transducer and focus dependent system constants.

Continuing with FIG. 3, the image size in mm or radians from block 18 and the minimum number of vectors from block 22 are provided to a vector density calculation block 24 to calculate the minimum vector density. The minimum vector density which achieves the target image resolution is the minimum number of vectors needed to achieve the target image resolution divided by the image size in mm or radians, depending on the transducer being used.

The present invention provides for a method for maximizing frame rate of an ultrasound imaging apparatus. Initially, an actual displayed image is determined. The actual displayed image is then used to determine a minimum vector density requirement for B which will provide a useful image, and a minimum vector density requirement for color mode which will provide a useful image. A vector spacing that will meet the minimum vector density requirements is then used.

The invention has been described in detail with particular reference to certain preferred embodiments thereof, but it will be understood that modifications and variations can be effected within the spirit and scope of the invention.

We claim:

1. A method for maximizing frame rate of an ultrasound imaging apparatus, comprising the steps of:

determining an actual displayed image size;

determining a minimum vector density requirement for a B mode which will provide a useful image based on the actual displayed image size;

determining a minimum vector density requirement for a color mode which will provide a useful image based on the actual displayed image size;

using a vector spacing that will meet the minimum vector density requirements.

2. A method for maximizing frame rate of an ultrasound imaging apparatus as claimed in claim 1 wherein the step of using a vector spacing that will meet the minimum vector density requirement comprises the step of adjusting the number of vectors in the image to meet the minimum vector density requirement.

3. A method for maximizing frame rate of an ultrasound imaging apparatus as claimed in claim 1 wherein the step of using a vector spacing that will meet the minimum vector density requirement comprises the steps of:

providing a full B mode vector set;

subsampling the full B mode vector set, to provide a B mode vector set subsample, to approximately match the minimum vector density requirement for the actual displayed image size.

4. A method for maximizing frame rate of an ultrasound imaging apparatus as claimed in claim 3 further comprising the step of calculating a new vector list to match the B mode vector set subsample.

5. A method for maximizing frame rate of an ultrasound imaging apparatus as claimed in claim 1 wherein the step of using a vector spacing that will meet the minimum vector density requirement comprises the steps of:

providing a full B mode vector set;

providing a full color mode vector set;

subsampling the full B mode and full color mode vector sets, to provide a vector set subsample to approximately match the minimum vector density requirement for the actual displayed image size.

6. A method for maximizing frame rate of an ultrasound imaging apparatus as claimed in claim 5 further comprising the step of calculating a new vector list to match the vector set subsample.

7. A method for maximizing frame rate of an ultrasound imaging apparatus as claimed in claim 1 wherein the actual displayed image size comprises a vertical image size.

8. A method for maximizing frame rate of an ultrasound imaging apparatus as claimed in claim 1 wherein the actual displayed image size comprises a horizontal image size.

* * * * *